United States Patent [19]
Ball et al.

[11] 3,792,761
[45] Feb. 19, 1974

[54] THROTTLE OVERRIDE CONTROLLED BY A VACUUM BOOSTED POWER BRAKE SYSTEM

[75] Inventors: Frank W. Ball; Harold L. Howard, both of Lansing, Mich.

[73] Assignee: General Motors Corporation, Detroit, Mich.

[22] Filed: Dec. 8, 1972

[21] Appl. No.: 313,605

[52] U.S. Cl. .............................. 192/3 M, 192/3 R
[51] Int. Cl. ...................... F16d 67/00, F16d 71/00
[58] Field of Search ......... 192/3 R, 3 T, 3 M, 3 TR; 91/369

[56] References Cited
UNITED STATES PATENTS

| | | |
|---|---|---|
| 3,495,692 | 2/1970 | Holgate .............................. 192/3 R |
| 2,911,078 | 11/1959 | Baker .................................. 192/3 R |
| 2,311,120 | 2/1943 | Mossinghoff ........................ 192/3 R |
| 2,066,667 | 1/1937 | Bellis .............................. 192/3 T X |

Primary Examiner—Benjamin W. Wyche
Assistant Examiner—Lance W. Chandler
Attorney, Agent, or Firm—R. L. Phillips

[57] ABSTRACT

A throttle override for a conventional throttle controlled internal combustion engine wherein an additional valve is positioned in the engine induction passage and is held closed by a spring but is normally held open during normal operation by a vacuum motor connected to the vacuum boosted power brake system of the vehicle.

2 Claims, 2 Drawing Figures

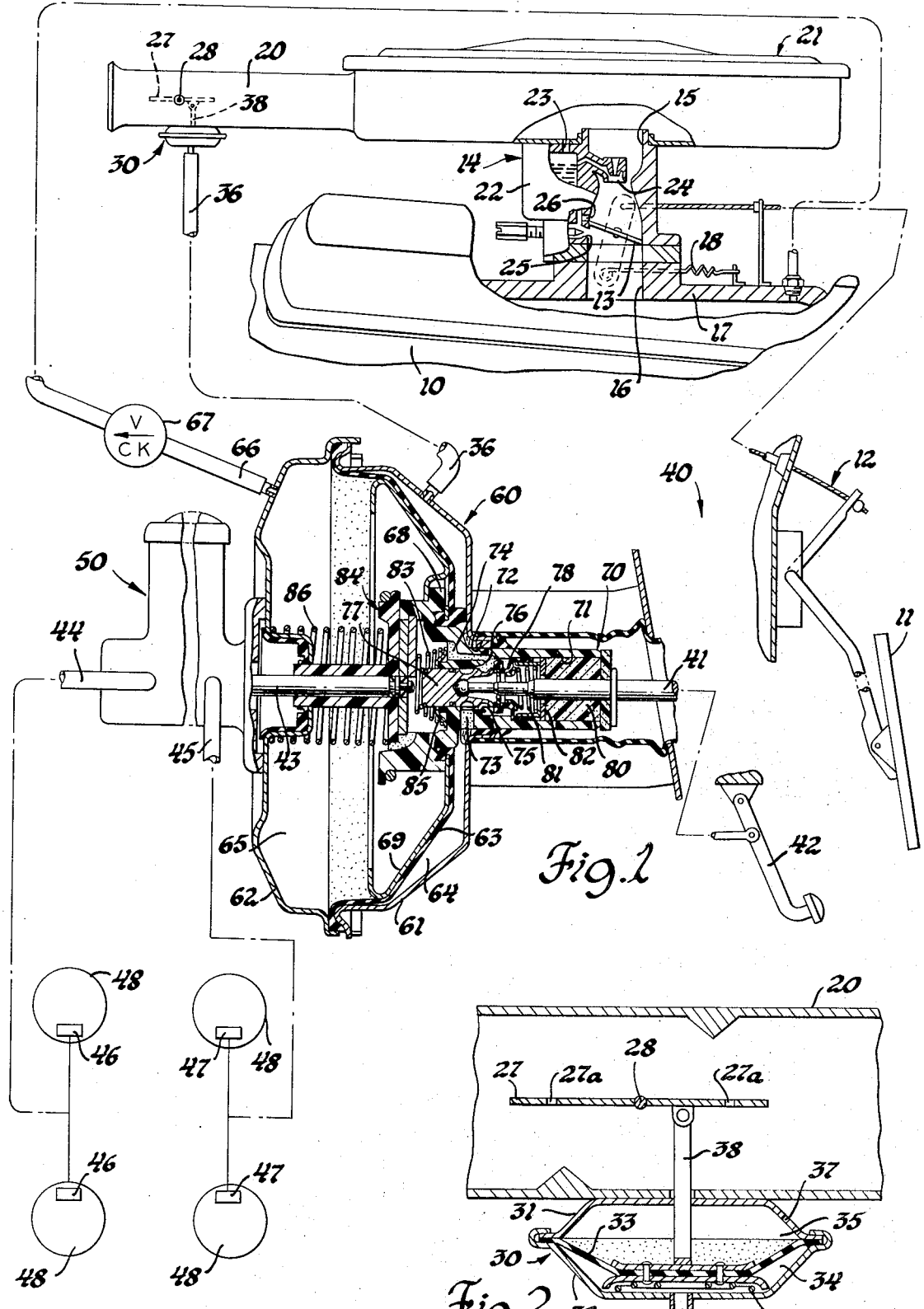

3,792,761

THROTTLE OVERRIDE CONTROLLED BY A VACUUM BOOSTED POWER BRAKE SYSTEM

SPECIFICATION

The present invention relates to a throttle control for an internal combustion engine and more particularly to a throttle override mechanism for a vehicle to control the flow of air to the engine as a function of brake actuation.

During normal vehicle operation, it is customary to decelerate the engine before effecting vehicle braking, but under certain conditions, this is not always possible. There may therefore be times when the throttle may not be returned to an idle or low idle position before vehicle braking is required and, under these conditions, the engine will be still operating to power the vehicle forward at the same time the operator is attempting to brake the vehicle to a stop. This latter condition will frequently occur, for example, with drivers who use their left foot for braking since their right foot may still be on the accelerator pedal holding the throttle valve open as they attempt to brake with their left foot.

It is therefore an object of this invention to provide a throttle override system for the internal combustion engine of a vehicle whereby a secondary valve is operable upon vehicle braking to control air flow to the engine in lieu of this air flow being controlled by the throttle valve.

It is another object of this invention to provide an air flow control system for the internal combustion engine of a vehicle wherein, in addition to the primary throttle valve for normally controlling the air flow in an engine air induction passage, a secondary air flow valve therein is operatively connected with and closed by actuation of the vacuum boosted power brake system of the vehicle.

It is a further object to provide an engine speed control of the foregoing type wherein the secondary air flow valve is normally power actuated by a vacuum motor to an open position but when the vacuum booster unit of the vehicle vacuum boosted power brake system is operated with at least a predetermined force the secondary air flow valve is closed.

These and other objects of the invention are attained by means of an air flow control valve positioned in the air induction passage of the engine of a vehicle upstream of the throttle valve in an internally vented carburetor. The air flow valve is normally biased to a closed position by a spring and is held open during normal engine operation by a vacuum motor connected to the vehicle vacuum system through the vacuum booster unit of the vacuum boosted power brake system of the vehicle. The air flow valve is closed when the vacuum motor is placed in communication with the atmosphere upon actuation of the air valve of the vacuum booster unit of the vehicle as the vehicle operator depresses the vehicle brake pedal to effect braking of the vehicle with at least a predetermined actuating force.

For a better understanding of the invention, as well as other objects and further features thereof, reference is had to the following detailed description taken in conjunction with the accompanying drawings, wherein:

FIG. 1 is a view partially in schematic and partially in cross section with parts broken away of a vehicle throttle override system provided in accordance with the present invention; and FIG. 2 is a sectional view of the air flow control valve and its power actuator of the throttle override system of FIG. 1.

Referring now to FIG. 1, there is shown the internal combustion engine 10 of a vehicle, not shown, the operation of which is controlled by means of an accelerator pedal 11 positioned for actuation by the vehicle operator. Accelerator pedal 11 is connected by a suitable throttle linkage 12 to the throttle valve 13 of a conventional carburetor 14 mounted on the engine 10 with the air passage 15 therein in alignment with the induction passage 16 in the intake manifold 17 of the engine whereby the throttle valve 13 can be moved between its open and closed positions to regulate the flow of air and fuel to the engine in a conventional manner, the return spring 18 connected as shown normally returning throttle valve 13 to its idle position upon removal of actuating force from pedal 11. Air is supplied to the air passage 15 of the carburetor through the air intake duct 20 of an air cleaner 21 mounted thereon. As shown, carburetor 14 is provided with a fuel bowl 22 vented by vent passage 23 to the incoming air, the fuel bowl supplying fuel to the main fuel nozzle 24, idle port 25 and off-idle port 26 of the carburetor in a conventional manner.

Referring now to the subject matter of the invention, the throttle override system includes an air flow control valve 27 positioned upstream of the throttle valve 13 whereby the air flow control valve can be used to control the flow of air to the engine to limit engine speed independent of the position of throttle valve 13. With this arrangement, the throttle valve 13 may be considered to be the primary valve normally controlling the operation of the engine while the air flow control valve 27 can then be considered to be a secondary valve adapted to control the operation of the engine in a manner and for a purpose to be described.

In the embodiment shown, a valve shaft 28 journaled in the air intake 20 pivotally mounts the secondary valve 27 therein to be moved by a differential fluid pressure operated motor, such as the vacuum motor 30, between an open position, as shown in the Figures, wherein air flow to the engine is controlled in a normal manner by the throttle valve 13 and a closed position wherein the air flow to the engine is controlled by secondary valve 27 regardless of the position of throttle valve 13. The variable pressure chamber of the vacuum motor 30 is selectively placed in communication either with the atmosphere or with the source of vacuum pressure, such as the vacuum in the induction passage 16 of the engine, as controlled by the air valve assembly in the vacuum booster unit 60 of the vehicle power brake system, generally designated 40, in a manner to be described.

As best seen in FIG. 2, vacuum motor 30 comprises a housing formed by two generally cup-shaped parts, an upper part 31 and a lower part 32 that securely seal a diaphragm 33 therebetween to define a lower or variable vacuum pressure chamber 34 and an upper or atmospheric chamber 35, the vacuum chamber 34 being connected by a conduit 36 to communicate with the variable pressure chamber of the vacuum booster unit 60 and the atmospheric chamber 35 being open to the atmosphere through an aperture 37 in the upper housing part 31. An actuator rod 38 is pivotally connected at one end to the secondary valve 27 and at its other end to diaphragm 33 to hold secondary valve 27 in the open position, as shown, when a sufficient differential pressure is created on the opposite sides of diaphragm 33. A spring 39 is positioned in the vacuum chamber 34 abutting at one end against the lower housing part 32 and at its other end against diaphragm 33 to normally bias diaphragm 33 in one direction, upward as shown in FIG. 2, to normally move secondary valve 27 to the closed position when the pressure in the vacuum chamber 34 is sufficiently increased so that the differential pressure on the opposite sides of diaphragm 33 is no longer sufficient to overcome the bias of spring 39.

To permit engine idling when the secondary valve 27 is closed, clearance can be provided between the secondary valve 27 and the interior wall of the air intake 20 to provide for a suitable air flow or, as shown, the valve 27 can be provided with flow apertures 27a of the desired size for the flow of sufficient air to the engine 10 to maintain its operation at an idling speed.

Operation of the vacuum motor 30 is controlled by the operation of the vehicle braking system 40 whereby during normal vehicle operation, with the vehicle braking system 40 in its released position, vacuum motor 30 is vacuum actuated to hold secondary valve 27 in its open position so that the operator has control of the engine operation in a conventional manner by the actuation of the throttle valve 13. However, when the operator actuates the vehicle braking system 40 with at least a predetermined braking pressure, vacuum motor 30 is vented to allow spring 39 to effect movement of the secondary valve 27 to the closed position to thus limit the air flow to the engine so that it can operate at a predetermined idling speed thus overriding the control of engine operation by throttle valve 13.

As shown in FIG. 1, the vehicle braking system 40 is of the conventional type having a power brake unit of the combined vacuum and hydraulic unit type which uses engine intake manifold vacuum and atmospheric pressure to provide power assisted application of the vehicle brakes. This type of power brake unit is composed of two main sections, a hydraulic master cylinder assembly 50 and the vacuum power cylinder or booster unit 60.

The vacuum booster 60 may be either of the conventional double diaphragm type or, as shown, a conventional single diaphragm type, such as disclosed in the U. S. Pat. No. 3,249,021, issued May 3, 1966, to Clarence R. Wuellner, and entitled "Power Brake Booster". With reference to FIG. 1, vacuum booster unit 60 has a push rod 41 pivotally connected to the vehicle braking pedal 42 and has a piston rod 43 extending into the hydraulic master cylinder assembly 50 which is connected by front and rear brake lines 44 and 45, respectively, to the front and rear brakes 46 and 47, respectively, to pump hydraulic pressure fluid thereto whereby braking of the set of vehicle wheels 48 is effected.

Vacuum booster 60 comprises a housing formed by generally cup-shaped right and left housing parts 61 and 62, respectively, separated by a centrally apertured diaphragm 63 into the right chamber 64 and the left chamber 65 with reference to FIG. 1. Right chamber 64 is selectively connected, as to be hereinbelow described, to either left chamber 65 or to the atmosphere and is hereinafter called the variable pressure chamber 64. The left chamber 65 is connected by a conduit 66 with a one-way check valve 67 therein to communicate with the engine vacuum provided at induction passage 16 and is hereinafter called the vacuum chamber 65. The outer periphery of diaphragm 63 is sealingly connected between the right and left housing parts 61 and 62 and the inner periphery of diaphragm 63 is sealingly connected to the radial flange 68 of a tubular-shaped power piston 70 having a centrally located stepped bore 71 therethrough, one end of power piston 70 being of a reduced diameter to be reciprocally received in a central aperture 72 of right housing part 61. A dish-shaped support plate 69 is connected to the power piston flange 68 on the left side of diaphragm 63 for movement therewith. The diaphragm 63, support plate 69 and power piston 70 form a power piston assembly that is movable as a unit within the vacuum booster housing.

Power piston 70 is also provided with one or more radial passages 73 extending through the tubular wall thereof and with one or more axial passages 74, only one radial passage 73 being shown located 90° from its actual position and only one axial passage 74 being shown. Each radial passage 73 communicates with an axial slot 75 in stepped bore 71 and the variable pressure chamber 64. Each axial passage 74 communicates at one end with the portion of stepped bore 71 outboard of an annular shoulder 76 located between the enlarged and reduced diameter portions of stepped bore 71 and at its other end with the vacuum chamber 65 through the enlarged left-hand bore end of power piston 70.

Reciprocably received in the reduced diameter portion of stepped bore 71 is an air valve seat member 77 that cooperates with an annular centrally apertured floating air valve 78 to provide an air valve for selectively connecting variable pressure chamber 64 to communicate with the atmosphere or with the vacuum chamber 65.

As described in greater detail in the hereinabove referenced U.S. Pat. No. 3,249,021 to Wuellner, floating air valve 78 is positioned concentrically about push rod 41 and provides thereabout a central passage, the right end of which communicates with the atmosphere through an annular filter 80 in the hub of the power piston and the left end of which is normally seated against the right end of air valve seat member 77. The right end of floating air valve 78 is sealingly retained in the enlarged diameter portion of stepped bore 71 and the left end of floating air valve 78 is biased leftwardly by a floating air valve spring 81 from a spring retainer 82 to normally seat on the right end of air valve seat member 77, thereby normally blocking communication between the variable pressure chamber 64 and the atmosphere.

An air valve spring 83 is positioned between the right end of the reaction assembly 84, which includes the piston rod 43, carried in the enlarged diameter portion of power piston 70 and a spring retainer cup 85 suitably secured to the left end of air valve seat member 77 to normally bias the air valve seat member 77, to the right as seen in FIG. 1, into seating relationship with the floating air valve 78. A power piston return spring 86 encircles the piston rod 43 within the vacuum chamber 65 to normally bias the power piston 70 to the right to the position shown in FIG. 1 wherein the power piston 70 engages against the housing part 61. This is the position of the aboveidentified elements with the brake system 40 in its released position, that is, with no braking pedal pressure being applied to brake pedal 42.

In the released position of the brake system 40, as shown in FIG. 1, the air valve seat member 77 is seated against floating air valve 78. The flow of air under atmospheric pressure, which enters through the filter 80 is blocked at the air valve seat member 77 which is seated against the floating air valve 78. In this position, the floating air valve 78 is held away from the valve seat formed by annular shoulder 76 in the power piston 70. Vacuum which is present at all times in vacuum chamber 65 is free to evacuate the variable pressure chamber 64 with flow therefrom being through radial passage 73, axial slot 75, the passage between shoulder 76 of the power piston and the floating air valve 78 and then through the axial passage 74 in the power piston. At the same time, vacuum in the variable pressure chamber 64 is applied through conduit 36 to the vacuum chamber 34 of vacuum motor 30. With vacuum pressure now present on one side of the diaphragm 33 of this motor and atmospheric pressure on the other side, the vacuum motor 30 is vacuum actuated to hold actuator rod 38 in a retracted or downward position with reference to FIGS. 1 and 2 whereby secondary valve 27 is held in its open position. Thus, whenever the brake system 40 is returned to or is in a released position, secondary valve 27 will be held in its open position.

When the vehicle operator applies the brakes by actuation of the brake pedal 42, the push rod 41 is moved to the left with reference to FIG. 1 to carry with it the air valve seat member 77. With such leftward movement of air valve seat member 77, the floating air valve 78 is biased leftwardly by floating air valve spring 81 to follow the air valve seat member 77 until the floating air valve 78 seats on shoulder 76 to block communication between the variable pressure chamber 64 and the vacuum chamber 65 by closing off flow through axial passages 74. After the floating air valve 78 is stopped by shoulder 76 from following leftward movement of air valve seat member 77, the air valve seat member 77 is unseated from the floating air valve 78 to provide a passage therebetween that connects the variable pressure chamber 64 to communicate with the atmosphere through radial passages 73, axial slots 75, the central aperture in floating air valve 78, the enlarged diameter portion of stepped bore 71, and air filter 80. Since vacuum chamber 65 is connected to communicate with engine vacuum provided in induction passage 16 of engine 10, this allows a leftwardly acting pressure differential to be created on the opposite sides of diaphragm 63 with the pressure in the variable pressure chamber 64 approaching atmospheric pressure upon the application of a predetermined force applied to brake pedal 42. This pressure differential causes diaphragm 63, power piston 70 and support plate 69 to move to the left from the position shown in FIG. 1, thereby effecting a corresponding leftward movement of reaction assembly 84 and its piston rod 43 to effect vehicle braking.

When a desired pedal pressure is reached, the power piston 70 has moved to the left sufficiently until the floating air valve 78, which is still seated against shoulder 76, again seats on the air valve seat member 77. Seating of the floating air valve on the air valve seat member shuts off the flow of air at atmospheric pressure and seals the reduced vacuum level in the variable pressure chamber which provides the power assist as this pressure acts against the diaphragm and power piston. The elements of the power brake unit are now in the holding position and will then remain in this relationship to each other until either pressure is applied or released at the brake pedal 42.

As the pressure in variable pressure chamber 64 increases to atmospheric pressure, which will occur when the brake pedal is actuated with at least a predetermined force, this air under pressure will flow from this chamber through conduit 36 to vacuum chamber 34 of vacuum motor 30 thereby allowing spring 39 to effect movement of secondary valve 27 to its closed position in the manner hereinabove described. As long as the brake pedal pressure, above a predetermined value, is applied, spring 39 will hold the secondary valve 27 in the closed position. With valve 27 held in the closed position, air flow to the engine 10 is restricted, irrespective of the position of throttle valve 13, to a predetermined flow rate so that the operation of the engine will be reduced to an idle speed mode of operation with adequate fuel flowing from the idle port 25 and off-idle port 26 of the carburetor to maintain engine operation at this reduced operating speed. If throttle valve 13 is open when secondary air flow valve 27 is closed upon application of the predetermined braking force, carburetor 14 continues to operate as a conventional internally vented carburetor in providing an air-fuel flow sufficient to idle engine 10 with fuel being supplied from the idle and off-idle ports of the carburetor.

Upon removal of actuating force from vehicle brake pedal 42, power piston 70 and air valve seat member 77 are returned rightwardly to their non-actuated or released positions, as previously described, by the power piston return spring 86 and air valve spring 83, thereby re-establishing the normal communication between the variable pressure chamber 64 and the vacuum chamber 65 while blocking communication between the variable pressure chamber 64 and the atmosphere so that vacuum is again applied in variable pressure chamber 64. As this occurs, vacuum is again applied to the vacuum chamber 34 of vacuum motor 30 so that vacuum motor 30 will effect movement of the valve 27 back to its normally open position with engine operation then controlled by throttle valve 13.

Engine 10 is thus operated at an idling speed whenever a braking force above a predetermined amount is applied to the vehicle braking system, and such idle speed operation is effected whether the vehicle operator inadvertently holds the throttle valve 13 open or not. Thus, the engine would be similarly operated at the idling condition even if the throttle linkage 12 or return spring 18 should for some reason not effect a normal return of throttle valve 13 to its idle position on removal of actuating force from throttle pedal 11.

Having described one embodiment of the present invention, it is understood that the specific terms and examples are employed in a descriptive sense only and not for the purposes of limitation. Other embodiments of the invention, modifications thereof, and alternatives thereto may be used. We therefore aim in the appended claims to cover such modifications and changes as are within the true spirit and scope of our invention.

What we claim as new and desire to secure by Letters Patent of the United States is:

1. In a vehicle including an internal combustion engine providing a source of engine vacuum and having an air induction passage, an operator controlled primary throttle valve pivotably mounted in the air induction passage to normally regulate an air-fuel flow to the engine; and a vacuum boosted power braking system including a brake pedal, hydraulic pump means hydraulically connected to the set of vehicle wheel brakes, and a vacuum booster unit operatively connected to the hydraulic pump means, the vacuum booster unit having a first pressure chamber, a second pressure chamber, and air valve means actuatable by actuation of the brake pedal, the first pressure chamber being connected to the source of engine vacuum and the second pressure chamber being selectively connectable by the air valve means to the first pressure chamber when the brake pedal is not actuated and to the atmosphere when the brake pedal is actuated:

a. secondary valve means pivotably mounted in the air induction passage upstream of the primary throttle valve for movement between an open position and a closed position;

b. differential fluid pressure actuated power means connected to said secondary valve means to effect movement thereof between said closed position and said open position, said differential fluid pressure actuated power means includes a housing, a diaphragm, and a spring, said diaphragm separating said housing into a first chamber and a second chamber, said diaphragm being operatively connected to said secondary valve to effect movement thereof between said open position and said closed position, said spring being positioned in said first chamber in abutment against said diaphragm to normally bias said diaphragm to move said air valve to said closed position, c. conduit means connecting the second pressure chamber of the vacuum booster unit to communicate with said first chamber of said differential fluid pressure actuated power means to effect movement of said secondary valve to said open position when the brake pedal is not actuated and to connect said first chamber to the atmosphere when the brake pedal is actuated with a predetermined actuating force.

2. In a vehicle having an internal combustion engine providing a source of engine vacuum; a carburetor having an air induction passage, an operator controlled throttle valve for normally regulating the air fuel flow to the engine; an air cleaner having an air intake passage mounted on the carburetor for delivering clean air to the air induction passage; and a vacuum boosted power braking system including a brake pedal, hydraulic pump means hydraulically connected to the set of vehicle wheel brakes, and a vacuum booster unit having a first pressure chamber, a second pressure chamber, an air valve means actuatable upon actuation of the brake pedal, said first pressure chamber being connected to a source of engine vacuum and the second pressure chamber being selectively connected by the air valve means to communicate with the first chamber when the brake pedal is not actuated and with the atmosphere when the brake pedal is actuated;

a. a secondary valve mounted in the air intake passage of the air cleaner for movement between an open position allowing a normal air delivery to the engine and an air flow reducing position for restricting the air flow to the engine;

b. differential fluid pressure actuated power means including a housing and a diaphragm, said diaphragm separating said housing into a first chamber and a second chamber, said first chamber being operatively connected to communicate with the second chamber of the vacuum booster unit and said second chamber being connected to communicate with the atmosphere, said diaphragm being operatively connected to said secondary valve to effect movement thereof from said air flow reducing position to said open position; and c. spring means operatively connected to said secondary valve to effect movement thereof from said open position to said closed position when the vehicle brake pedal is actuated with more than a predetermined braking effort.

\* \* \* \* \*